Figure 2A:
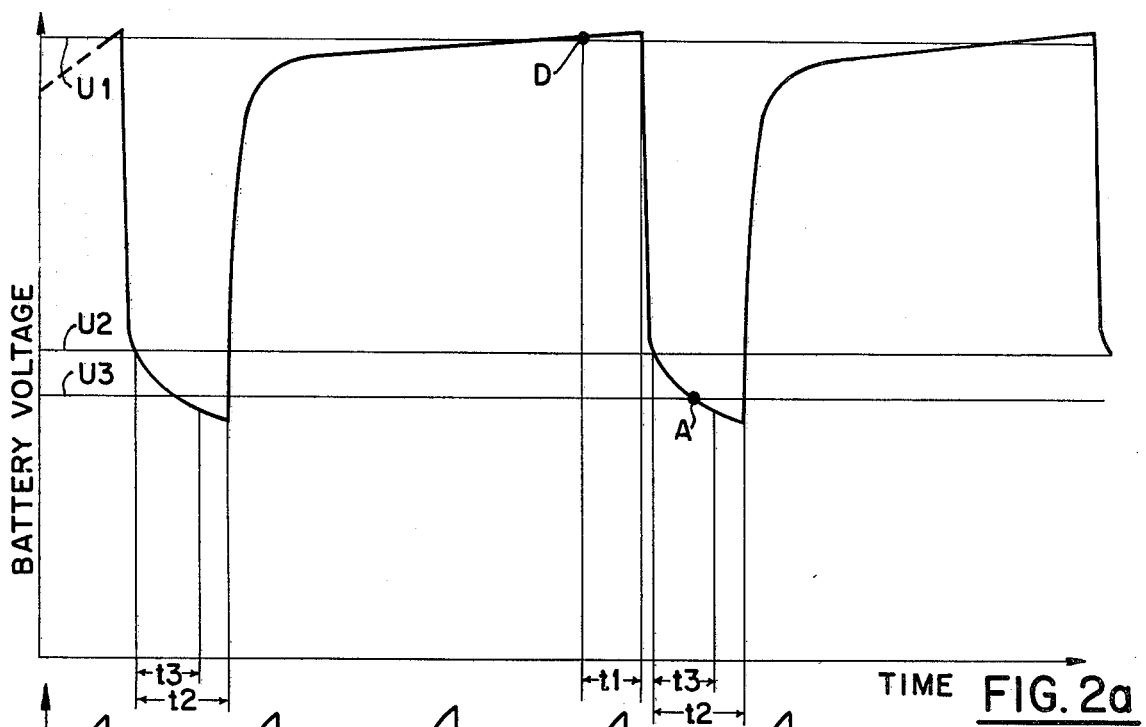

United States Patent [19]
Schmitt et al.

[11] 3,938,019
[45] Feb. 10, 1976

[54] CHARGING OF STORAGE BATTERIES

[75] Inventors: Gerhard Schmitt, Ffm-Zeilsheim; Gerhard Knierim, Fischbach, both of Germany

[73] Assignee: Varta Batterie Aktiengesellschaft, Hannover, Germany

[22] Filed: Dec. 11, 1974

[21] Appl. No.: 531,557

[30] Foreign Application Priority Data
Jan. 2, 1974   Germany............................ 2400090

[52] U.S. Cl. ........................ 320/21; 320/23; 320/39
[51] Int. Cl.² .......................................... H02J 7/10
[58] Field of Search ................... 320/20, 21, 22–24, 320/39, 40, 11, 13, 14

[56] References Cited
UNITED STATES PATENTS
| | | | |
|---|---|---|---|
| 3,487,284 | 12/1969 | Cady................................ | 320/40 X |
| 3,510,746 | 5/1970 | Furuishi et al........................ | 320/39 |
| 3,700,997 | 10/1972 | Smith................................... | 320/20 |

*Primary Examiner*—J. D. Miller
*Assistant Examiner*—Robert J. Hickey
*Attorney, Agent, or Firm*—Weiser, Stapler & Spivak

[57] ABSTRACT

A battery is charged using a heavy charging phase, followed by a pulse charging phase. During the latter, charging continues beyond a predetermined battery voltage, for a predetermined interval. During a measuring portion of the succeeding charging pause, the falling battery rest potential is measured and the pulse charging phase is terminated when the measured rest potential no longer falls below a predetermined level.

7 Claims, 5 Drawing Figures

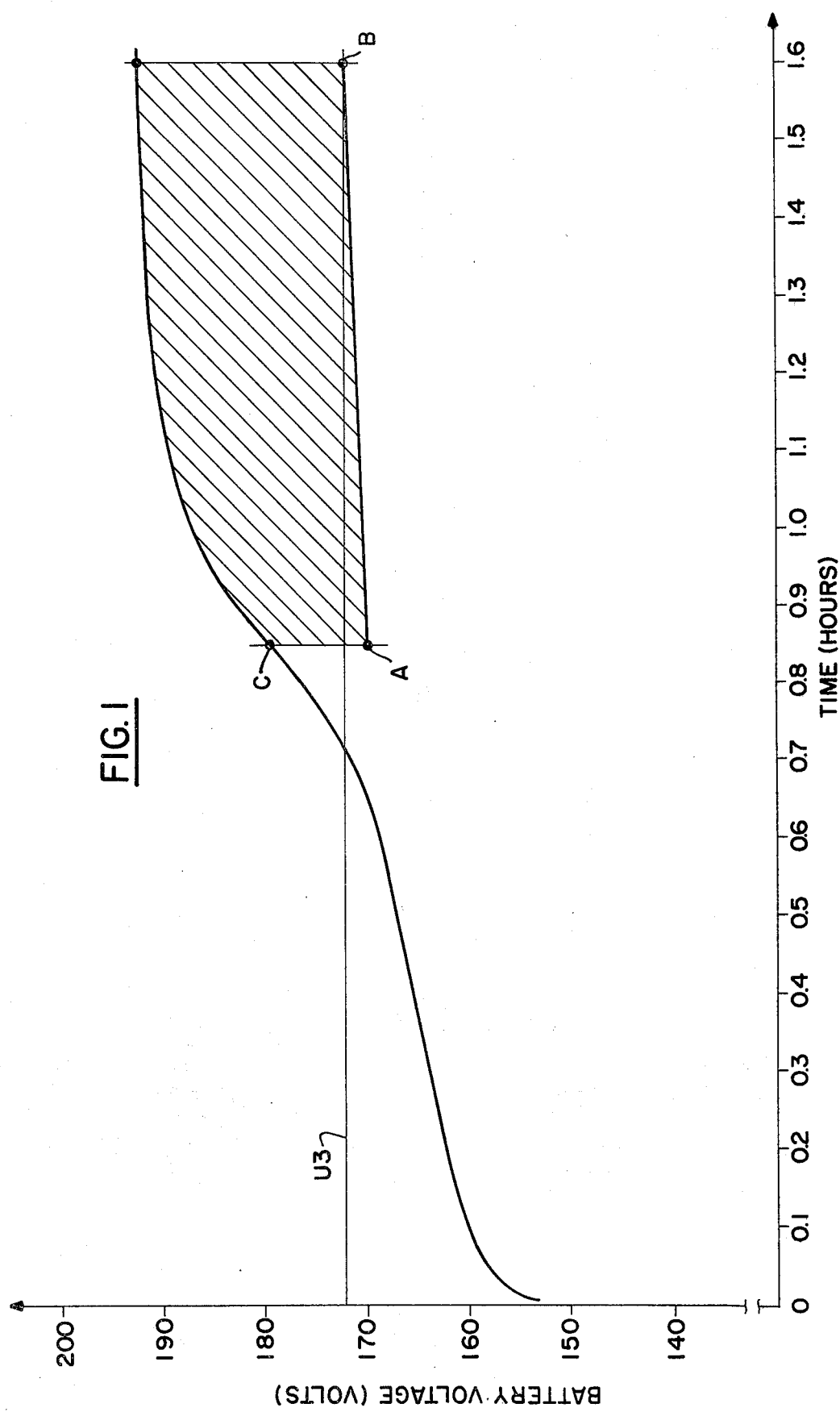

CHARGING OF STORAGE BATTERIES

The invention relates to a method and apparatus for charging storage batteries, characterized by a heavy charging phase which is discontinued upon attainment of a predetermined battery voltage and which is then switched over to a pulse charging phase.

Battery charging apparatus is known in which, upon approaching the full-charge potential of the battery, the unidirectional current produced by the rectifier is steadily switched on and off, depending on the state of charge of the battery. In this charging apparatus two trigger circuits are provided, one of which senses the upper voltage limit during charging, while the other senses the lower voltage during discharging. Such charging apparatus yields only a slight reduction in the charging time.

It is an object of this invention to provide a technique for charging storage batteries which makes it possible to charge storage batteries within a very short time, without the drawback of a significant loss of water.

This and other objects which will appear are achieved in accordance with the invention by utilizing a heavy charging phase during which charging is carried out with constant current. Upon attainment of a predetermined battery voltage level, charging is continued with constant current pulses. During this pulse charging phase there is provided a predetermined charge-continuation interval after each attainment of said voltage level, at the end of which the charging pulse is turned off. During each pause between consecutive charging pulses, the battery rest potential is sensed over a predetermined measuring interval and compared with a reference potential. Finally, the whole pulse charging phase is discontinued, once the battery rest potential during the abovementioned measuring interval no longer drops below the said reference potential.

In a preferred embodiment of the invention, a Schmitt trigger circuit is connected to the battery. This circuit responds to attainment of a predetermined voltage level to produce a positive-going output switching transient which starts the charge-continuation interval. At the end of the charge-continuation interval the charging pulse is turned off. In response to the ensuing dropping of the rest potential of the battery to the lower trigger level of the Schmitt trigger circuit, the latter reverses state and the resulting negative-going switching transient in its output signal starts the pause and measuring intervals. A second Schmitt trigger circuit, also connected to the battery, operates during the measuring interval to compare the rest potential of the storage battery with the reference potential defined by the lower switching level of said second Schmitt trigger circuit. The latter's output signal starts the next succeeding charging pulse.

Figure 2B:
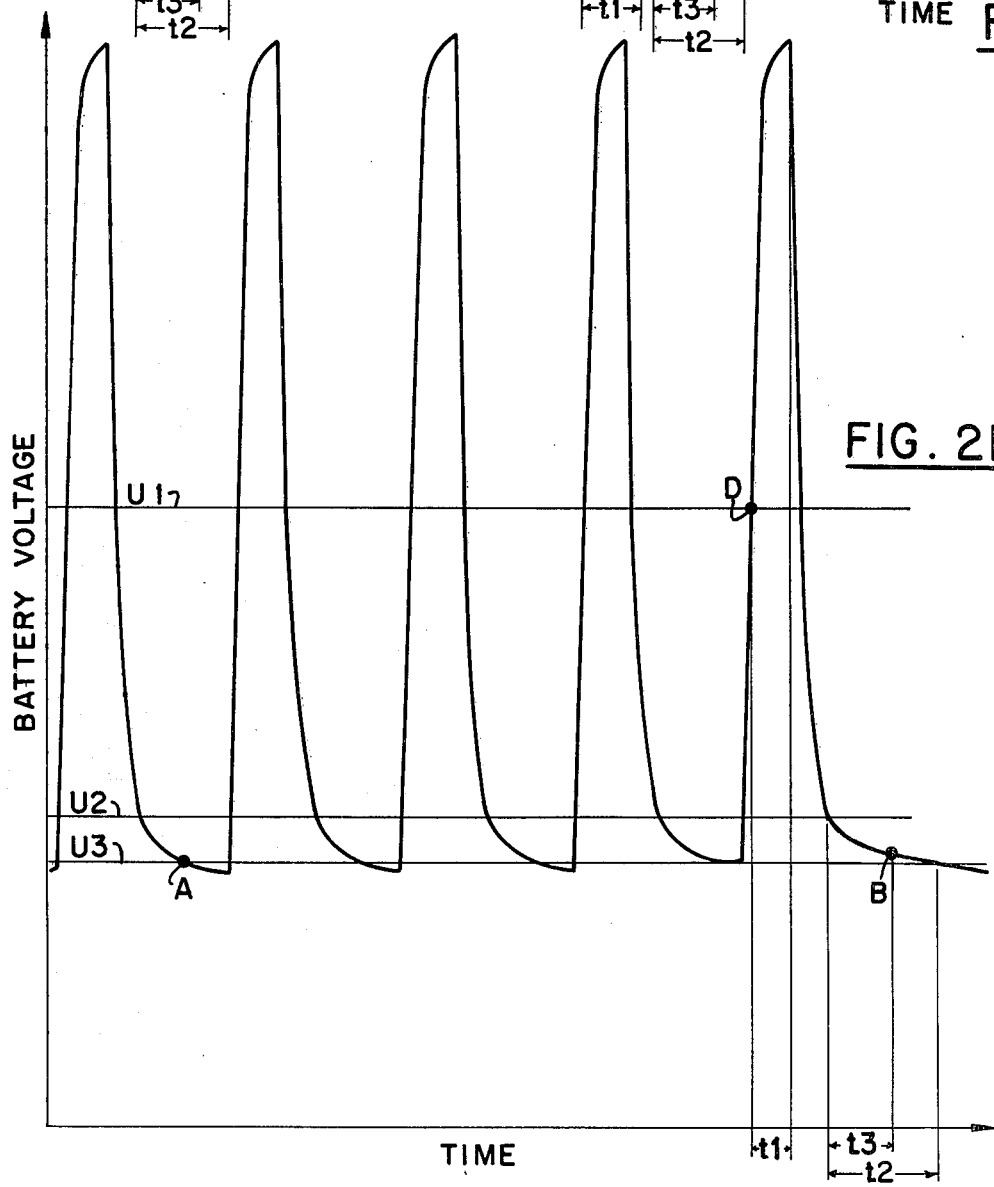
Figure 3:
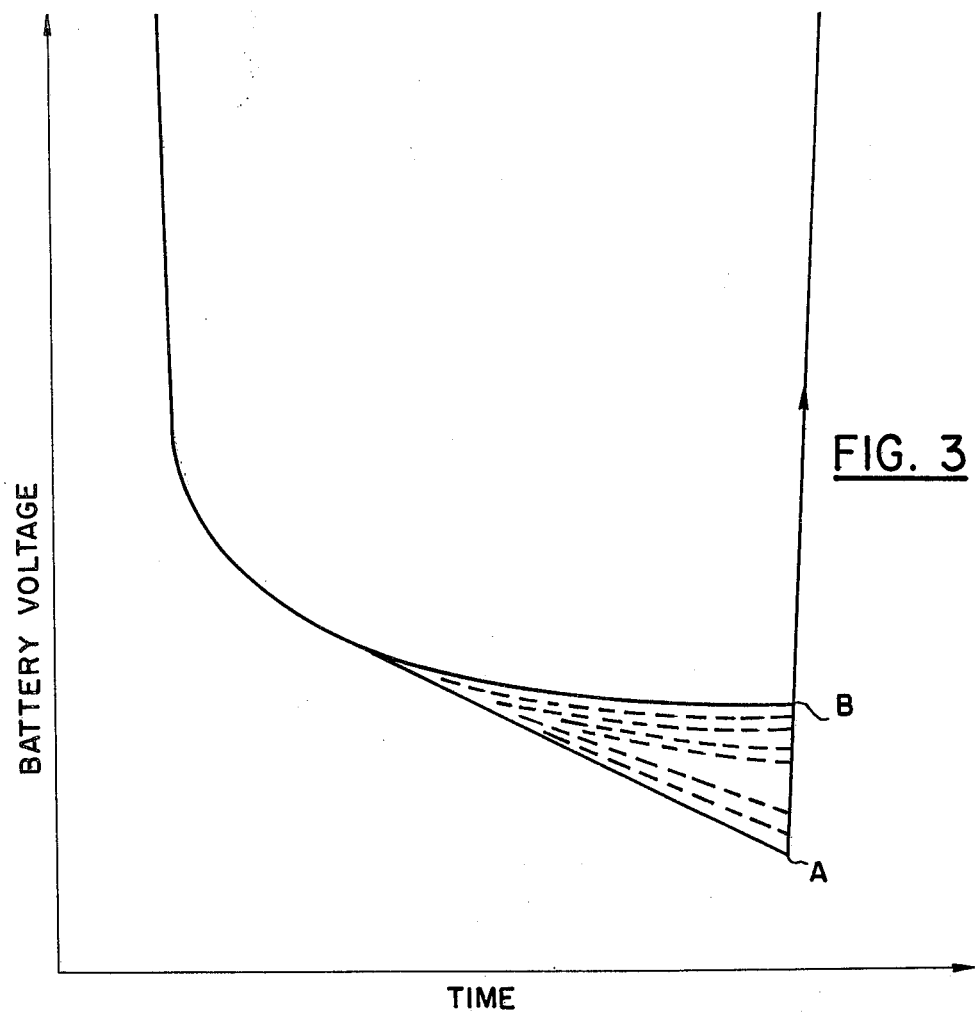
Figure 4:
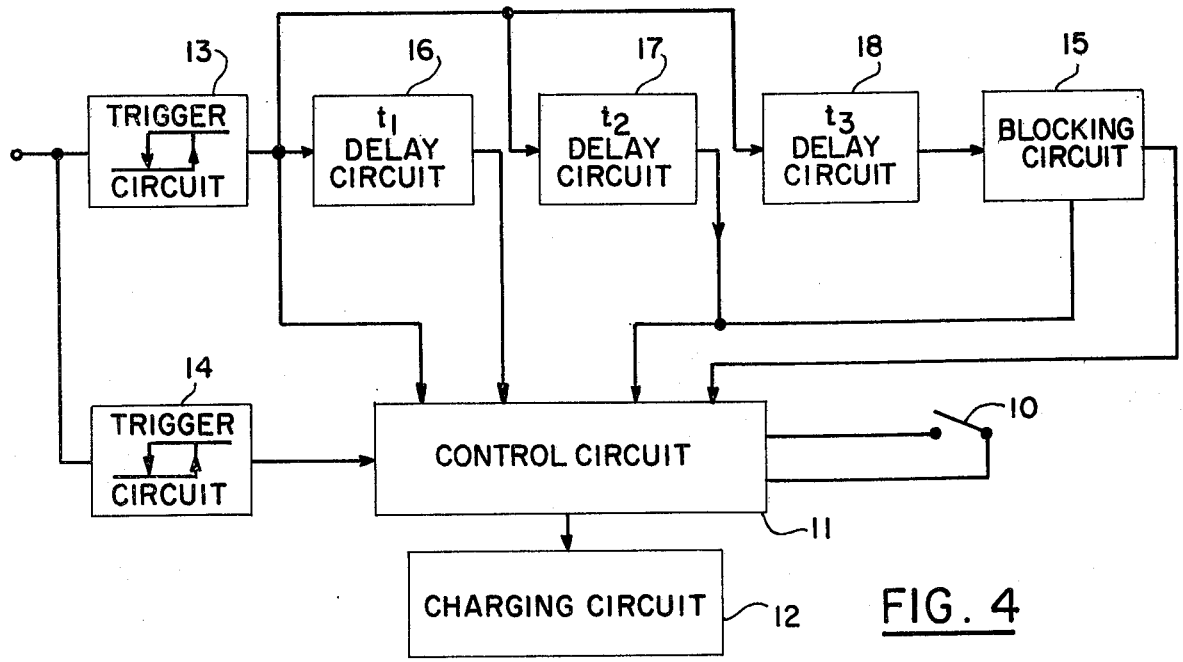

For further details, reference is made to the discussion which follows in the light of the accompanying drawings, wherein FIG. 1 shows the variation with time of the voltage of a battery when treated in accordance with the invention;

FIGS. 2a and 2b, respectively, show the variations of battery voltage with time at the beginning and end of the second charging phase;

FIG. 3 shows the variation in voltage as a function of time during the pauses in charging; and FIG. 4 shows, in block diagram form, an embodiment of the invention.

The same reference characters are utilized in the various figures to denote similar phenomena.

As shown in FIG. 1, the charging process consists of two phases, the heavy charging phase and the pulse charging phase. During the heavy charging phase, the battery is charged with a constant current of, say, 100 amperes, until the battery voltage reaches point C in FIG. 1. The battery voltage then has the value U1. At that time, the charging process is shifted, e.g. electronically, into its pulse charging phase. In that phase, charging in accordance with the invention takes place with constant current charging pulses of, say, 100 amperes. Until the fully charged state is reached, the battery potential rises freely. FIG 3 shows this rise during charging pauses as extending from point A to point B. As shown in FIGS. 2a and 2b, the battery voltage rises during charging pulses and reaches the value U1 at point D. During the immediately following charge-continuation interval $t1$ the battery voltage is free to rise further. This charge-continuation interval $t1$ brings about an appreciable reduction of the total charging time. The optimum adjustment of the charge-continuation interval is determined by the particular type of battery being charged. This charge-continuation interval $t1$ depends, among other things, upon the internal resistance of the respective battery. Too long an interval $t1$ leads to excessive gas evolution. Too short an interval leads to incomplete charging. An interval of about 0.5 to about 3 seconds has been found to be particularly suitable. If a value lying within this range is selected for the charge-continuation interval, then the water loss remains within reasonable bounds and, at the same time, a reduction in total charging time of about 30% is experienced, compared to conventional techniques. At the start of the pulse charging phase, there occurs during the charging pauses $t2$ a drop in battery voltage within the measuring intervals $t3$ to a value significantly below U3 (point A in FIGS. 2a and 2b). Through increase in acid concentration with increasing charging time, the rest potential of the battery also goes up during the charging pauses $t2$ and, having reached point B (FIGS. 1 and 2), it no longer falls below the reference voltage U3 during the measuring interval $t3$. When that happens, the charging current is turned off in accordance with the invention.

The functioning of the charge control system embodying the invention may be seen from the block diagram of FIG. 4, to which reference may now be had.

Upon connecting the system of FIG. 4 to the battery, as discussed further below, push button switch 10 is depressed to start the battery charging. This energizes the control circuit 11 which governs the operation of the charging circuit 12, which is connected in conventional manner to the battery terminals (not shown). The battery voltage thereupon rises until it reaches the upper switching level of Schmitt trigger circuit 13, which is also connected to the battery terminals in conventional manner (not shown) so as to sense that battery voltage. The trigger circuit 13 thereupon switches and a positive-going voltage transient is developed in its output. This positive-going switching transient starts the charge-continuation interval, during which the battery voltage continues to rise. At the end of this charge-continuation interval the charging is interrupted and the battery voltage declines.

Upon reaching its lower switching level, the Schmitt trigger circuit 13 switches its output in a negative sense. This negative-going transient, which corresponds to decline of the battery voltage to level U2 in FIGS. 2a and 2b, starts the charging pause and measuring intervals t2 and t3. The measuring interval is typically shorter than the charging pause interval, being, for example, 66% of the latter. If, during the measuring interval t3, the battery voltage has fallen below the reference voltage constituted by the trigger level of Schmitt trigger circuit 14, then, at the end of the charging pause interval t2, the charging begins again. This Schmitt trigger circuit 14 also senses the battery voltage, being connected in conventional manner (not shown) to the battery for that purpose.

When the battery reaches its fully charged state, then the battery no longer falls below the reference voltage defined by trigger circuit 14 during the measuring interval. As a result, at the end of the pause interval during which this occurs, battery charging is automatically terminated.

The various intervals t1, t2 and t3 are established by delay circuits 16, 17 and 18, respectively.

To insure full charging of the battery, there is preferably provided a measurement blocking circuit 15, which blocks the first few, e.g. the first four measuring intervals following the end of the heavy charging phase, and makes the whole system insensitive to the battery voltage levels which prevail during these first few intervals. During this time, electrolytic equalization processes take place which cause the battery voltage to fluctuate, once the charging current has been turned off, in a manner which is different than during subsequent portions of the pulse charging phase.

The individual circuits represented by blocks in FIG. 4 may take a variety of conventional forms and are therefore not illustrated in further detail.

Preferably, digital logic is utilized for the various timing and control functions. Thus, each of delay circuits 16, 17 and 18 may take the form of a monostable multivibrator, responsive to the appropriate transient in the output of trigger circuit 13 to change from its stable to its unstable condition. The return to its stable condition may be controlled by a variable R-C network which can be adjusted to provide the appropriate interval t1, t2 and t3, respectively.

Blocking circuit 15 can be built around a digital counter, which counts the appropriate number (e.g. four) of occurences of outputs from pause delay circuit 17. Until this number has been counted the counter acts, through suitable AND-gate circuitry, to prevent the output from measurement delay circuit 18 from reaching control circuit 11 in such a way as to cause control circuit 11 to stop resumption of pulse charging. Once the desired number of pulses has been counted, the counter switches over to permit control circuit 11 to react to a charge-stopping signal.

Charging circuit 13 may take the form of a thyristor power device controlled selectively by a 7kH$_z$ multivibrator, which is turned on and off at the appropriate intervals under the control of the various signals feeding into control circuit 11. Circuit 11 also includes a switching circuit supplied with the outputs from trigger 14, blocking circuit 15 and switch 10, whose outputs in turn appropriately reset the counter of blocking circuit 15 and also cooperate through AND-gates with the delay circuit outputs to control the multivibrator which in turn controls the charging thyristor.

The technique embodying the invention makes it possible, through suitable adjustment of the charge-continuation interval, to achieve a charging time reduction of about 30% compared with conventional methods.

We claim:

1. A method of charging a storage battery, utilizing a heavy charging phase followed by a pulse charging phase, and comprising the steps of:
    charging during said heavy charging phase with constant current until a predetermined battery voltage U1 is reached;
    charging during the subsequent pulse charging phase with constant current pulses which include a charge-continuation interval t1 following the attainment of said battery voltage U1 in response to each said pulse;
    shutting off the charging pulse at the end of each t1 interval for a pause of duration t2;
    measuring the battery rest potential during a measuring interval t3 within said pause and comparing said rest potential with a reference value; and
    terminating the pulse charging phase when said rest potential ceases to fall below said reference value during a measuring interval.

2. The method of claim 1, wherein said terminating of the pulse charging phase is inhibited during the first few pauses following the heavy charging phase.

3. The method of claim 1, wherein each said measuring interval starts at substantially the same time as a pause, but lasts less long than said pause.

4. The method of claim 3, wherein each measuring interval lasts about 66% as long as the corresponding pause.

5. A storage battery charging system wherein continuous heavy charging is used to bring the battery voltage up to a predetermined level U1, said system comprising:
    means responsive to the attainment of said voltage U1 to continue charging said battery for a period t1 and discontinuing said charging at the end of said period t1;
    means for sensing the dropping of said battery voltage after said discontinuing to a level U2;
    means responsive to said U2 level sensing to start both a measuring interval of duration t3 and a pause in the charging of duration t2 longer than t3;
    means for comparing said battery voltage with a reference voltage U3 lower than U2 during said measuring interval; and
    means for restarting said charging only if said battery voltage falls below said voltage U3 during said measuring interval t3.

6. The system of claim 5, wherein said means responsive to U1 attainment includes a Schmitt trigger circuit which switches from one state to the other in response to said U1 attainment, and which switches back to said one state in response to said U2 level sensing.

7. The system of claim 6, wherein said means for restarting said charging includes a second Schmitt trigger circuit which switches from one state to the other in response to the dropping of said battery voltage below said reference voltage U3.

* * * * *